United States Patent [19]

Phillips et al.

[11] 4,034,809

[45] July 12, 1977

[54] HYDROLYZED POLYACRYLAMIDE LATICES FOR SECONDARY OIL RECOVERY

[75] Inventors: Kenneth G. Phillips, River Forest; Robert Bernot, Chicago; Edward G. Ballweber, Glenwood, all of Ill.

[73] Assignee: Nalco Chemical Company, Oak Brook, Ill.

[21] Appl. No.: 667,767

[22] Filed: Mar. 17, 1976

[51] Int. Cl.$^2$ .......................................... E21B 43/22
[52] U.S. Cl. .............................. 166/270; 166/275; 166/300
[58] Field of Search ............... 166/305 R, 274, 275, 166/295, 270, 300; 252/8.55 R, 8.5 P

[56] References Cited

U.S. PATENT DOCUMENTS

| 3,308,885 | 3/1967 | Sandiford | 166/305 R |
|---|---|---|---|
| 3,415,318 | 12/1968 | Meijs | 166/300 X |
| 3,721,295 | 3/1973 | Bott | 166/295 |
| 3,724,547 | 4/1973 | Bott | 166/274 |
| 3,724,551 | 4/1973 | Troscinski et al. | 166/295 |
| 3,841,399 | 10/1974 | Ryan | 166/275 X |
| 3,893,510 | 7/1975 | Elphingstone et al. | 166/295 |

*Primary Examiner*—Stephen J. Novosad
*Assistant Examiner*—George A. Suchfield
*Attorney, Agent, or Firm*—John G. Premo; Robert A. Miller; Barry W. Sufrin

[57] ABSTRACT

A process for recovering oil from subterranean oil-bearing formations which entails the use of a water treating medium. The water treating medium comprises an acrylamide-acrylic acid copolymer formed by hydrolyzing a water-in-oil emulsion containing from 2–75% by weight of finely divided acrylamide polymer to the extent that between 0.8 and about 67% of the amide groups originally present in the acrylamide polymer are converted into carboxyl groups.

12 Claims, No Drawings

HYDROLYZED POLYACRYLAMIDE LATICES FOR SECONDARY OIL RECOVERY

BACKGROUND OF THE INVENTION

1. Field of the Invention

This invention relates to the secondary recovery of petroleum from subterranean formations; in particular, this invention concerns an improved water flooding process.

In general, water flooding consists of introducing an aqueous medium into one or more injection wells which penetrate a partially depleted oil-bearing formation: the water flooding medium is forced through the formation toward one or more production wells which likewise penetrate the formation. In the so-called "five-spot drive," the flooding medium is forced down four injection wells which are symetrically located around a production well. The flooding medium passes through the formation displacing the residual oil present therein and carrying it into the production well from which it is recovered by conventional means.

Unfortunately, oil-bearing formations are generally of very non-uniform permeability. The formations usually contain numerous pockets, cracks and other physical characteristics which result in widely varying formation permeability relative to the flow of aqueous media and oil. Thus, when conventional water flooding is undertaken the flooding medium tends to follow a path of least resistance bypassing a good part of the oil present in the formation. As described in the patent art listed below, two methods may be employed for dealing with this problem.

The first of these is concerned with the water flooding operation at the point of the input well. Various viscosity-increasing additives may be introduced into the aqueous water flooding medium in order to establish a more or less planer front with which to sweep the oil from the subterranean formation and into the production well. The formation of so-called "fingers" of flooding medium extending through the zones of highest permeability may thus be reduced by increasing the viscosity of at least the forward portion of the flooding medium to near that of the oil to be recovered or greater. Significant increases in oil output may be achieved in this manner.

The second means for dealing with the non-uniform permeability of the subterranean formations entails the treatment of the production well. The intent of this process is to plug the channels of high permeability (and generally low oil content) thereby forcing the flooding medium which is introduced at the input wells to sweep through the high oil-bearing portions of the formation. An aqueous high viscosity treating medium is introduced at the production well in order to accomplish the blockage of the high permeability areas. Significant improvement in the oil/water ratio obtained at the production well may be achieved in this manner.

Our invention entails the discovery of an improved medium for use in water flooding operations in accordance with the practices just described. The improved treating medium of our invention may be introduced at production wells as well as at input wells.

2. Description of the Prior Art

1. U.S. Pat. 2,827,964; B. B. Sandiford (Union Oil); Issued Mar. 25, 1958.

A water flooding process for recovering petroleum from subterranean formations is disclosed using viscosity-increasing additives in the form of water-soluble, partially hydrolyzed acrylamide polymer. The acrylamide polymers employed include homopolymers of acrylamide as well as water-soluble copolymers of acrylamide with up to 15% by weight with other polymerizable vinyl compounds such as alkyl esters of acrylic and methacrylic acids and methacrylamide. Hydrolysis of the acrylamide polymers entails the conversion to carboxyl groups of between about 0.8–10% of the acrylamide amide groups. The examples in this patent use "typical partially hydrolyzed acrylamide polymers."

2. U.S. Pat. No. 3,039,529; K. R. McKennon (Dow Chemical); Issued June 19, 1962.

Water flooding process for the recovery of petroleum from subterranean formations is disclosed using viscous aqueous compositions containing polyacrylamides of molecular weights of at least 500,000 and preferably 1,000,000 or more wherein from 12 to about 67% of the original carboxamide groups have been hydrolyzed to carboxyl groups. The polyacrylamides employed may be homopolymers of acrylamide or water-soluble copolymers of acrylamide with up to about 10% by weight of other suitable polymerizable vinyl compounds such as vinyl acetate, acrylonitrile, methacrylonitrile and the like.

3. U.S. Pat. No. 3,087,543; H. S. Arendt (Jersey Production Research); Issued Apr. 30, 1963.

Method for preferentially reducing or eliminating water production from an oil or gas producing subsurface formation by treating the producing well with an acrylamide carboxylic acid copolymer is taught. The test examples disclosed in this patent employ Separan 2610 (Dow Chemical product) which is believed to be obtained by the hydrolysis of acrylamide. (See No. 4 below.)

4. U.S. Pat. No. 3,308,885; B. B. Sandiford (Union Oil); Issued Mar. 14, 1967.

Treatment of subterranean hydrocarboniferous formations in order to decrease the water/oil ratio of the total well effluent and to increase the production rate of hydrocarbon fluids is taught. The invention entails the injection, through a producing well, of an aqueous solution of a high molecular weight (at least 200,000 and preferably 1,000,000) water-soluble polyacrylamide wherein at least 8% and not more than 70% of the amide groups have been hydrolyzed to carboxylic acid groups.

The invention is distinguished from that aspect of the water flooding process in which either treated or untreated water is used to "sweep" oil from partially depleted wells. The Sandiford invention rather is likened to Arendt (U.S. Pat. No. 3,087,543; see No. 3 above) in that beneficial effects accrue only while the treating agent is present in the formation surrounding the producing well bore.

The patent claims that the hydrolyzed polyacrylamide disclosed therein is "much more effective in reducing water permeability than the acrylate-carboxylic acid copolymer disclosed in the Arendt patent." The patentee further promises to show this to be the case at a point further on in the specification, although no such demonstration is apparent. Furthermore, the copolymer utilized in Arendt is described in Arendt merely as "an acrylamide carboxylic acid copolymer"; the only copolymer utilized in Arendt is Separan 2610 which, it is believed, is produced by the hydrolysis of acrylamide rather than by copolymerization as suggested in Sandiford.

5. U.S. Pat. No. 3,343,601; D. J. Pye; (Dow Chemical); Issued Sept. 26, 1967.

Water flooding method directed toward inhibiting ferric hydroxide plugging is disclosed which entails the use of an aqueous injection fluid containing a small amount of a water-soluble hydrosulfite and an optional polymeric additive such as a homopolymer of acrylamide or a copolymer thereof with acrylic acid.

6. U.S. Pat. No. 3,721,295; L. L. Bott (Nalco Chemical); Issued Mar. 20, 1973.

Water flooding process for the recovery of petroleum from subterranean formations directed toward reducing the amount of water recovered from the producing well by introducing a water-in-oil emulsion containing 0.01-35% by weight of a finely divided water-soluble vinyl addition polymer is described. The water-soluble vinyl addition polymers include acrylamide polymers such as polyacrylamide and its water-soluble copolymeric derivatives such as acrylamide-acrylic acid salt copolymers. The polymeric latex is generally employed as a concentrate which is diluted with an organic liquid just prior to use.

The water-in-oil emulsion is inverted in the presence of water in the subterranean formation; upon inversion, the polymer goes into aqueous solution forming a uniformly viscous solution. The rate of inversion of the latex may be increased through the incorporation of a surfactant into the latex.

7. U.S. Pat. No. 3,724,547; L. L. Bott (Nalco Chemical); Issued Apr. 3, 1973.

Water flooding process is described which utilizes the composition described in U.S. Pat. No. 3,721,295 (No. 6 above) for recovering oil from subterranean oil-bearing formations. The two patents should be distinguished in that U.S. Pat. No. 3,721,295 is concerned with reducing the amount of water recovered from the producing well whereas U.S. Pat. No. 3,724,547; is concerned with "sweeping" the oil from the subterranean oil-bearing formation.

8. U.S. Pat. No. 3,779,316; L. L. Bott (Nalco Chemical); Issued Dec. 18, 1973.

Water flooding process for the recovery of petroleum from subterranean formations directed toward reducing the amount of water recovered from the producing well by introducing a stable liquid dispersion containing a water-soluble anionic vinyl addition polymer and a water-soluble cationic polymer is described. The water-soluble vinyl addition polymers include the homo- and copolymers of acrylic acid and the water-soluble salts thereof, such as polyacrylic acid-sodium salt; the water-soluble cationic polymers include alkylene polyamines such as ethylene dichlorideammonia condensation polymers, and polyethylene imine.

9. U.S. Pat. No. 3,780,806; L. L. Bott (Nalco Chemical); Issued Dec. 25, 1973.

Water flooding process is described for recovering oil from subterranean oil-bearing formations through the use of the stable liquid dispersion of U.S. Pat. No. 3,779,316 (No. 8 above). This patent differs from the U.S. Pat. No. 3,779,316 patent in that the liquid dispersion is being used to sweep oil from the oil-bearing formation rather than to reduce the amount of water recovered from the producing well.

10. U.S. Pat. No. 3,893,510; E. A. Elphingstone (Halliburton); Issued July 8, 1975.

In a water flooding process for recovering petroleum from subterranean formations, the use of high molecular weight polymers to reduce the permeability of the oil-bearing formation to the flow of water is described. Suitable water-soluble polymers for dispersion in the water-in-oil emulsion include polyacrylamide and copolymers of acrylamide and sodium acrylate.

OBJECTS

It is an object of this invention to improve the efficiency of the secondary recovery of oil from subterranean formations.

It is an object of this invention to provide an additive for use in the secondary recovery of oil from subterranean fromations which will improve the sweep of the oil from the subterranean formations. It is a further object of this invention to provide an additive which will increase the oil/water ratio obtained in the secondary recovery of oil from subterranean formations.

Yet another object of this invention is to provide a hydrolyzed polyacrylamide additive, produced by hydrolysis of an emulsified acrylamide polymer, which may be used as an additive in the secondary recovery of oil to obtain results superior to the results obtained with hydrolyzed polyacrylamide produced by solution hydrolysis or copolymerization.

Further objects will appear hereinafter.

THE INVENTION

This invention relates to a process for recovering oil from subterranean oil-bearing formation. It entails the use of an aqueous treating medium which comprises an acrylamide-acrylic acid copolymer formed by hydrolyzing a water-in-oil emulsion which contains — prior to hydrolysis — from 2-75% by weight of finely divided acrylamide polymer. Hydrolysis is carried out to such an extent that between 0.8 and about 67% of the amide groups originally present in the acrylamide polymer are converted into carboxyl groups.

A very important aspect of the invention resides in the fact that by hydrolyzing the water-in-oil emulsion of acrylamide polymer we are able to obtain upon inversion of the emulsion, a hydrolyzed acrylamide polymer product (acrylamide-acrylic acid copolymer) with greater viscosity per unit weight than would be obtained by either a solution hydrolysis of acrylamide polymer or copolymerization of acrylamide and acrylic acid. This improved viscosity per unit weight is associated with improved water flooding results, both in terms of increased amounts of oil recovered and increased oil/water ratios produced at the production well.

It will be apparent from the discussion herein that the benefits of our invention are obtained by inverting the emulsified hydrolyzed polyacrylamide at some point in the secondary recovery process. Inversion techniques are well known in the art. In all cases, inversion is accomplished in the presence of water under varying inversion conditions. When we say "in the presence of water" we generally mean water additional to that already present in the emulsion. When we refer to "inversion conditions" we intend to include any and all means whereby the emulsion may be inverted, including by the introduction of surfactants and by agitation of the emulsion.

The particular oil recovery process with which we are here concerned, widely referred to as "secondary recovery," entails the use of one or more producing wells and one or more input wells. According to the secondary recovery process, an aqueous flooding medium is injected into the one or more input wells which penetrate the oil-bearing formation in order to force the oil present within the formation into the one or more production wells which likewise penetrate the formation.

The improved composition of this invention has utility in the treatment of both the input and the production wells. In either application, the composition is utilized in the presence of water — water present or introduced into the well or water admixed with the composition at the well head prior to introduction of the composition into the well. When employed generally in the treatment of subterranean oil-bearing formations in order to carry out or improve secondary oil recovery, the composition of our invention will be referred to herein as a "treating medium"; when applied at an input well, the composition of our invention will be referred to herein as a "flooding medium."

The treating medium is used at the production well in order to resist the flow of aqueous fluids while promoting oil flow through subterranean oil-bearing formations which are subjected to secondary recovery,. In one embodiment of our invention, the treating medium is pumped into the production well in the form of a water-in-oil emulsion. Once in the formation, the water-in-oil emulsion contacts water already present in the formation and the emulsion inverts, thereby releasing the hydrolyzed acrylamide polymer. This water is present in the well due to natural causes or it may be introduced at the well head prior to introduction of the treating medium. As discussed further herein, one or more surfactants may be introduced into either the water or the acrylamide polymer emulsion in order to promote inversion.

In another embodiment of the invention, the water-in-oil emulsion is inverted prior to the introduction of the treating medium into the producing well. In this latter embodiment, the treating medium as it is introduced at the well head comprises an aqueous solution of the hydrolyzed acrylamide polymer.

In addition to its use at the producing well as noted above, the composition of this invention has great utility as a flooding medium applied at input wells. In this application the flooding medium is introduced into the subterranean oil-bearing formations through an input well which penetrates the formations and it is then forced through the formation toward a producing well.

The flooding medium will comprise from 2–75% by weight of a finely divided acrylamide polymer where the water-in-oil emulsion has been hydrolyzed to such an extent that between 0.8 and 67% of the amide groups originally present in the acrylamide polymer have been converted into carboxyl groups. The water-in-oil emulsion (after hydrolysis) may be inverted and then introduced into the input well. Alternatively, the flooding medium may be introduced into an input well in the emulsion from where it will contact with water already present in the subterranean formation. Water present in the formation may be there due to natural causes or it may be introduced at the well head; the water or the emulsion may additionally contain surfactants to aid inversion of the hydrolyzed acrylamide polymer.

PREFERRED EMBODIMENT

In a preferred embodiment a treating medium comprising a water-in-oil emulsion containing 10–45% by weight of acrylamide polymer is used wherein hydrolysis of the emulsion is carried out to such an extent that between about 12 and about 40% of the amide groups originally present in the acrylamide polymer have been converted into carboxyl groups. In this preferred embodiment, the emulsion (hydrolyzed) is inverted prior to introduction into a producing well.

In another preferred embodiment, a flooding medium is applied at the input well. This flooding medium comprises a water-in-oil emulsion containing 10–45% by weight of acrylamide polymer wherein hydrolysis of the emulsion is carried out to such an extent that between about 12 and about 40% of the amide groups present in the polyacrylamide have been converted into carboxyl groups.

In the most preferred embodiment, the hydrolyzed acrylamide polymer emulsion will be diluted with an organic liquid just prior to use so that the polymer concentration will be in the range 0.1–10% by weight. The organic diluent will be used at both input and production wells.

THE ACRYLAMIDE POLYMER

The acrylamide polymers which are employed in this invention include homopolymers of acrylamide and copolymers thereof with up to 25% by weight of other suitable polymerizable vinyl compounds such as vinyl acetate, acrylonitrile, methacrylonitrile, vinyl alkyl ethers, vinyl chloride, acrylic acid and the like, provided that the copolymers so employed are characterized by water-solubility and relative freedom from cross-linking.

The acrylamide polymers should be of molecular weight at least 100,000 and preferably of molecular weight 1,000,000 or more. The polymers may be produced by any known methods of conducting polymerization reactions such as solution polymerization and emulsion polymerization.

THE WATER-IN-OIL EMULSION

The water-in-oil emulsions may be prepared by any number of known techniques. The oils used in preparing these emulsions may be selected from a large group of organic liquids which include liquid hydrocarbons and substituted liquid hydrocarbons.

A. Organic Liquids to Form Emulsion

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil & Refining Company under the tradename ISOPAR M. Typical specifications of this narrow-cut isoparaffinic solvent are set forth below in Table I:

TABLE I

| SPECIFICATION PROPERTIES | MINIMUM | MAXIMUM | TEST METHOD |
| --- | --- | --- | --- |
| Gravity, API at 60/60° F | 48.0 | 51.0 | ASTM D 287 |
| Color, Saybolt | 30 | | ASTM D 156 |
| Aniline Point, ° F | 185 | | ASTM D 611 |
| Sulfur, ppm | | 10 | ASTM D 1266[1] |
| Distillation, ° F | | | ASTM D 86 |

TABLE I-continued

| SPECIFICATION PROPERTIES | MINIMUM | MAXIMUM | TEST METHOD |
|---|---|---|---|
| IBP | 400 | 410 | |
| Dry Point | | 495 | |
| Flash Point, °F (Pensky-Martens closed cup) | 160 | | ASTM D 93 |

[1] Nephelometric mod.

The amount of oil used in relation to the water to prepare the emulsion may be varied over wide ranges. As a general rule, the amount of oil-to-water may vary between 5:1–1:10 with preferable emulsions being prepared in the ratio of 1:2–1:10. These ratios are illustrative of emulsions that can be prepared, although it should be understood that the invention is not limited thereby.

B. Emulsifying Agents

The emulsions may be prepared by any number of techniques. For example, the emulsions may be prepared by using high-speed agitation or ultrasonic techniques. In most instances, however, it is desirable that the emulsion be a stable emulsion and to achieve this end it is often necessary to employ an oil-soluble emulsifying agent. The amount of emulsifying agent necessary to provide an emulsion will have to be determined by routine experimentation. As a general rule it may be said that the amount of oil-soluble emulsifier may range from 0.1–30% by weight based on the weight of the oil. To produce stable emulsions the amount of emulsifier will normally be within the range of 3–15% by weight of the oil.

Rather than provide an exhaustive listing of suitable emulsifiers, we prefer to generally recommend as being satisfactory the so-called low HLB materials which are well documented in the literature and are summarized in the Atlas HLB Surfactant Selector. Although these emulsifiers are useful in producing good water-in-oil emulsions, other surfactats may be used as long as they are capable of producing these emulsions. For instance, we have found that certain high HLB surfactants are capable of producing stable water-in-oil emulsions. A typical low HLB emulsifier is sorbitan monooleate.

C. Dispersing the Polymers into the Water-in-Oil Emulsions

In order to form the water-in-oil emulsion of acrylamide polymer, the polymer must be dispersed into the water-in-oil emulsion. The polymers produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1–5 microns. After the powders have been comminuted, they may be dispersed into the water-in-oil emulsion by means of agitation provided by such devices as stirrers, shakers, homogenizers and the like. To be commercially practical, the amount of polymer in the emulsion should be at least 2% by weight. The invention contemplates using emulsions containing between 2–75% by weight with preferred emulsions having a polymer concentration within the range of 10–45% by weight. In some cases, the starting emulsions are converted to suspensions due to the nature and the amount of the polymer present therein.

The method of preparing a water-in-oil emulsion by the use of a homogenization device is quite simple. Water is added with agitation to an oil-emulsifier mixture to make an emulsion. The finely-divided polymer particles are then added to the emulsion with rapid agitation. The particle size of the polymer should be within the range of 1 micron to about 5 microns. This suspension of polymer particles in the emulsion is passed through a homogenizer. The amount of pressure necessary to produce a smooth emulsion varies: the minimum pressure requirement is a function of the abrasiveness of the polymer, the concentration of the polymer and the particle size of the polymer. In general, the pressure requirement is between 1,000–3,000 psi. However, depending upon those variables listed, the pressure requirement could be lower or exceed the stated range. A typical homogenizer device is the Manton-Gaulin type.

From a commercial standpoint it is beneficial that the acrylamide polymer emulsions thus described be stable, yet at the same time contain relatively large amounts of polymer. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of acrylamide polymer directly from the monomers from which the polymers are synthesized.

Such polymer-containing emulsion may be synthesized by using the water-in-oil emulsion polymerization technique set forth in U.S. Pat. No. 3,284,393. The teachings of this patent comprise forming a water-in-oil emulsion of water-soluble ethylenic unsaturated monomers. The emulsion is formed by utilizing a water-in-oil emulsifying agent. To this monomer is added a free radical-type polymerization catalyst and then heat is applied under free radical-forming conditions to form water-soluble polymer latices. The polymeric latex concentrates produced by this patent are relatively unstable and frequently must be treated with additional emulsifiers to render the products stable.

HYDROLYZING THE ACRYLAMIDE POLYMER EMULSION

Hydrolysis is achieved by contacting the acrylamide polymer oil-in-water emulsion with an amount of base sufficient to hydrolyze between 0.8 and 67% of the amide groups present in the acrylamide polymer molecule. Preferably the base used will be a fairly strong base; aqueous alkali is an effective base in this application with 50% aqueous NaOH being the most preferred base.

It should be noted that weak bases may also be employed in the hydrolysis of the emulsified acrylamide polymer. Examples of typical weak bases include $Na_2CO_3$ and $NH_3$. When weak bases are employed, the rate of hydrolysis will be very slow. Hence, weak bases can be advantageously employed only when the extent of hydrolysis sought is low, typically under 10%.

The extent of hydrolysis may be varied by adjusting the reaction conditions including, for example, base concentration, temperature, reaction time and rate of addition of base. Since it is important to avoid destabilizing the acrylamide polymer emulsion and/or degrading the polymer itself, the range of practical reaction conditions will be somewhat limited: permissible reaction condition limitations will be determined by experiment. Hydrolysis temperature, for example, should probably not exceed 90° C, and preferably should be below 60° C; base addition should be gradual and dispersion of the base should be uniform.

It has been found that many of the emulsifying agents commonly used to produce and maintain the acrylamide polymer emulsion are subject to hydrolysis which will result in destabilization of the emulsion. When such hydrolysis-sensitive emulsifying agents are employed, and the extent of hydrolysis of the acrylamide polymer sought exceeds about 5%, it may be necessary to employ a secondary emulsifier which is not hydrolysis-sensitive. We have found that this secondary emulsifier should be hydrophobic, preferably with HLB under 9 and most preferably with HLB 6 or less. A preferred secondary emulsifying agent may be formed by reacting oleic acid with ethylene oxide (2 moles of ethylene oxide per molecule) to obtain an emulsifying agent with HLB about 4.9.

It has been found that the presence of $NH_3$ formed during hydrolysis leads to instability of the emulsion and results in the formation of small amounts of insoluble polymer. Thus, it is important to remove or reduce the amount of $NH_3$ remaining in the emulsion after hydrolysis. Although various methods for removing the $NH_3$ will be apparent to those skilled in the art, a preferable method of removal entails vacuum stripping of 80% of the ammonia followed by neutralization using $CO_2$. $CO_2$ is employed because gaseous materials generally will enter the emulsion more readily than liquids. A limited amount of a weak acid is recommended to accomplish neutralization of the $NH_3$ in order to avoid gelling problems which would result from the use of strong acids and high acid concentrations.

It has been noted that the rate of hydrolysis falls sharply after about 40-50% of the acrylamide amide groups have been converted to carboxyl groups. Initial hydrolysis of the acrylamide polymer appears to take place rapidly, but as the anionic charge builds up along the polymer chain, it becomes increasingly difficult to hydrolyze adjacent amide groups. It is believed, however, that it is possible to obtain hydrolysis to the extent of 67% if the amide groups originally present in the acrylamide polymer. The extent of hydrolysis may be determined by conventional analytical methods such as titration and infra red analysis.

DILUTING THE EMULSION

Generally, the polymeric emulsion (hydrolyzed acrylamide polymer) will be diluted with an organic liquid just prior to use. As mentioned above, the preferred polymeric emulsion prior to dilution will have from 10-45% by weight of acrylamide polymer. The emulsion may be diluted just prior to use with an organic liquid so that the water-in-oil emulsion will have 0.1-10% by weight of the hydrolyzed acrylamide polymer.

The polymeric emulsion can be diluted with the organic liquid (including crude oil) near the location of the well where it is to be used. This on-site dilution procedure may be performed in a mixing tank near the well location and then be pumped directly into the well. The organic liquids useful in this application include both aromatic and aliphatic hydrocarbon compounds. Thus, such organic hydrocarbon liquids are benzene, xylene, toluene, mineral oils, kerosene, naphthas and petroleums may be used. In particular, the petroleum recovered from the primary recovery operation (crude oil) may be used to dilute the polymeric latex concentrate for use. The use of petroleum obtained from the primary recovery operation eliminates the burdensome problems in handling other organic liquids but also results in a great decrease in cost.

Oftentimes it is desirable to use a more concentrated flooding medium than the ones defined above. If such is the case, the polymeric emulsion may be used without dilution with an organic liquid.

In general, the polymeric emulsion, prior to dilution, will have a composition as follows:

A. Water ranging between about 5 and 25% by weight;
B. Acrylamide polymer having a concentration between about 2 and 75% by weight;
C. A water-in-oil emulsifying agent having a concentration between about 0.1 and 30% by weight;
D. Organic liquid comprising the remainder.

The polymeric emulsion upon dilution will typically have a composition as follows:

A. Water ranging between about 0.25 and 4% by weight;
B. Acrylamide polymer having a concentration between about 0.1 and 10% by weight;
C. A water-in-oil emulsifying agent having a concentration between about .0005 and 5% by weight;
D. Organic liquid comprising the remainder.

INVERTING THE WATER-IN-OIL EMULSION

When a water-in-oil emulsion of the type discussed above is inverted in the presence of water, the acrylamide polymer goes into aqueous solution forming a uniformly viscous solution. The rate at which this occurs may be controlled by the type and amount of emulsifier used to prepare the polymer system. Thus, when the treating medium in the form of a water-in-oil emulsion is pumped into a well, it will mix with water in the subterranean formation at which time the polymer will be released forming a viscous polymeric solution. Oftentimes it is convenient to introduce the emulsion in the presence of a surfactant by adding the surfactant to the water in the formation or to the emulsion itself just prior to pumping the emulsion into the subterranean formation. The placement of a surfactant into the treating medium or the water present in the formation causes the emulsion to more rapidly invert and release the polymer in the form of an aqueous solution. When this technique is used to invert the flooding medium the amount of surfactant present may vary over a range of from 0.1-10% based on polymer. The technique of inverting water-in-oil emulsions of water-on-oil polymers is a well known art; an important patent in this area is U.S. Pat. No. 3,624,019.

As discussed earlier, the water-in-oil emulsion may be inverted before introduction into the subterranean formation through either the input or a producing well. Inversion at this point will entail the use of clear water or brine and optionally the use of a surfactant. When a surfactant is used, generally from 0.1–10% by weight based on polymer of the surfactant is effective. The decision as to whether to invert the emulsion prior to introducing in into a well rather than inverting it after introducing it to the well will be made by one skilled in the art based upon convenience and upon the particular conditions of the oil-bearing formation at the well site.

THE SURFACTANTS

The preferred surfactants for inverting the emulsions are hydrophilic and are further characterized as being water-soluble. Any hydrophilic-type surfactant such as ethoxylated nonyl phenols, ethoxylated nonyl formaldehyde resin, dioctyl esters of sodium sulfosuccinate, and octyl phenol polyethoxyethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher amines like lauryl amine hydrochloride, and stearyl amine hydrobromide.

Any anionic, cationic or nonionic compound can be used as a surfactant.

Following is a list of suitable surfactants that could be used in the practice of this invention. Any water-soluble surfactant could be used, but naturally some are more efficient than others. Useful surfactants include, but are not limited to: polyoxyethylene alkyl phenol, polyoxyethylene (10 mole) cetyl ether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (12 mole) stearyl ether, polyoxyethylene (20mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

EXAMPLES

EXAMPLE 1

A water-in-oil emulsion of acrylamide polymer can be prepared according to the teaching of U.S. Pat. 3,284,393, as noted earlier. The technique of the U.S. Pat. No. 3,284,393 patent generally entails:

A. Using as a reaction mixture:
 1. water which contains dissolved therein an acrylamide monomer thereby producing a monomer phase, having a concentration of from 2–75% by weight of the emulsion;
 2. an inert hydrophobic liquid ranging between 5 and 35% by weight by the emulsion;
 3. water-in-oil emulsifying agent in a concentration of 0.1–30%;
 4. a free radical initiator whereby a water-in-oil emulsion is formed; and, B. Heating the emulsion under free radical conditions to polymerize the water-soluble vinyl addition monomer containing emulsion thereby producing a stable water-in-oil emulsion which contains dispersed therein finely-divided particles of a water-soluble vinyl addition polymer.

Samples of acrylamide polymer emulsion for use in the examples below are generally prepared according to the following recipe:

|  | % By Weight (Approx.) |
| --- | --- |
| Isopar M | 29.2 |
| Sorbitan Monooleate | 1.5 |
| Water | 42.5 |
| Acrylamide | 27.2 |
| Toluene | 0.5 |
| Azobis(isobutyronitrile) | 0.02 |

The Isopar M and the Sorbitan monooleate are charged to a reactor and mixed until the emulsifiers are completely dissolved. The ingredients in the reactor are brought to 115° F under an atmosphere of high purity nitrogen. An acrylamide-water blend is prepared and added to the oil phase in the reactor. The temperature is allowed to return to 115° F and the reactor is purged with high purity nitrogen for 30 minutes. Azobis (isobutyronitrile) in toluene is then added to initiate polymerization and the temperature is allowed to climb as high as 118° F due to the heat of reaction. The reaction is allowed to proceed to completion with the resulting product a stable emulsion.

EXAMPLE 2

Samples of the acrylamide polymer water-in-oil emulsion of Example 1 were hydrolyzed by contacting the emulsion with sodium hydroxide. Hydrolyzed samples were prepared as follows:

A commercial nonionic emulsifier with HLB 4.9 formed by reacting oleic acid with ethylene oxide (2 moles of ethylene oxide to each mole of oleic acid) was slowly added into a 300 gram sample of the water-in-oil emulsion with stirring. After the addition was completed, the emulsion was warmed up to 45° C and 27 grams of a 50% NaOH solution was added over a period of half an hour. The reaction was allowed to continue for 4 additional hours at 45° C and then the reaction mixture was cooled to room temperature. The final product was found to contain 27% active polymer.

Ammonia produced in the reaction described above was eliminated by 2 different procedures. The first method of ammonia elimination entailed sparging of the reaction mixture with nitrogen during the course of hydrolysis. The second method of ammonia elimination entailed vacuum stripping of the ammonia at approximately 100 mm of Mercury after the completion of the reaction.

The removal of ammonia formed during the production of hydrolyzed polyacrylamide is a problem of some concern. Besides utilizing the procedures just described, this problem can be minimized or eliminated by starting with an acrylate copolymer (in the water-in-oil emulsion) and hydrolyzing to a desired increase acrylate content. The amount of ammonia thus produced may be small enough that it need not be removed, or that it may be neutralized through the use of $CO_2$ or acetic acid. Yet, upon inversion of the emulsion, the hydrolyzed product is expected to exhibit viscosity per unit weight superior to a similar polymer produced by solution hydrolysis or copolymerization.

EXAMPLE 3

In order to evelute the emulsion hydrolyzed polyacrylamide of Example 2, it was necessary to invert the emulsion to release the polymer into water. Inversion was carried out in the laboratory according to one of the inversion procedures described below:

A. Regular Inversion

1. Weight sufficient hydrolyzed acrylamide polymer (designated x ml.) emulsion into an 8 ounce wide mouth jar to make 200 grams of a 0.25% solution by weight, based on polymer.

2. Prepare an inverter solution of a nonionic surfactant comprising an ethoxylated nonyl phenol with 10 ethylene oxide groups per molecule by placing 1.25 grams of the surfactant into a 2 liter volumetric flask, adding deionized water, stirring and diluting to volume.

3. Place 200-x ml. of the inverter solution into a 200 ml. graduated cylinder. Mount the jar containing the polymeric emulsion under a stirrer, add half of the inverter solution and stir. As the solution becomes more viscous, add remainder of inverter solution.

4. After all inverter solution has been added, increase stir speed to 1750 RPM and stir for at least 15 minutes.

5. Place 40 grams of the solution of step 4 into an 3 ounce wide mouth jar, add 60 ml. of deionized water and 100 ml. of 6% brine and stir for 15 minutes at 250-300 RPM to make 200 ml. of 500 ppm polymer in 6% brine solution.

B. Direct Inversion

1. To a 600 ml. beaker add an aliquot (designated x ml.) of a nonionic surfactant comprising an ethoxylated nonyl phenol with 10 ethylene oxide groups per molecule in order to supply 10% by weight of the surfactant, based on the weight of the polymer to be inverted.

2. Add (150-x) ml. of deionized water to the 600 ml. beaker and mix. While rapidly stirring the surfactant-water mixture, add 0.6 grams of the water-in-oil emulsion.

3. The mixture will shortly thicken (about 1-2 minutes). When this occurs, add 150 ml. of 6% brine.

4. The overall mixture is then stirred at about 2,000 RPM for 90 minutes, figured from the addition of step 3 to insure complete inversion.

EXAMPLE 4

It will be apparent to those skilled in the art that increases in the viscosity of water flooding media would be expected to be associated with improved water flooding results. However, it will also be apparent to those skilled in the art, that at some point the viscosity of the flooding medium will interfere with the passage of that media through the oil-bearing subterranean formation. In other words, when applied at an input well, the amount of pressure required to force the flooding medium through the formation will be unacceptably high; similarly, when applied at a production well the extent of penetration of the treating medium will be insufficient to significantly affect the oil to water output ratio.

In order to screen treating media which will not penetrate or which will require unacceptable pressure levels in order to be moved through the subterranean formations, the concept of "non-pluggers" has been developed. A "non-plugger" is a treating medium which, when injected at a constant rate through a simulated oil-bearing formation will not require unacceptable pressure levels — a plugger will require excessive pressure. The "non-plugger" test can also be described in terms of constant injection pressures and varying flow rates through the simulated formation: at constant pressure, unacceptably low flow rates correspond to "pluggers."

The plugging phenomena is believed to be caused by structural aspects of the hydrolyzed acrylamide polymer such as branching, cross-linking and gell formation. It is believed that the emulsion hydrolysis process of the present invention produces polymer with a blocked carboxylate structure in contrast to the alternating copolymer structure produced in the solution hydrolysis of acrylamide polymer. The latter alternate copolymer structure is likely formed due to the strong electrostatic repulsion of adjacent groups which prevents hydrolysis of adjacent amide groups. In contrast to this, hydrolysis of the emulsified acrylamide polymer occurs at the limited number of adjacent amide sites on the outer surface of the tightly coiled acrylamide polymer molecule. The latter assumes, of course, that the rate of hydrolysis greatly exceeds the rate of diffusion of the hydrolyzing agent to the interior of the emulsified polymer coil. The above theoretical explanation is not intended to limit the invention in any way.

It is desirable to obtain the highest viscosity per unit weight non-plugging form of the hydrolyzed polyacrylamide. Hydrolyzed polyacrylamide may, as noted earlier, be obtained by solution hydrolysis, by copolymerization and by the emulsion hydrolysis of our invention. As will be demonstrated in Example 5, emulsion hydrolysis produces a treating medium which is non-plugging to higher viscosities per unit weight levels than hydrolyzed polyacrylamide produced by copolymerization or by solution hydrolysis. The present example will demonstrate that emulsion hydrolysis produces a treating medium which is non-plugging to higher viscosities than a similar polymer produced by copolymerization (acrylamide-sodium acrylate copolymer).

Plugging tests were run as follows:

1. Prepare a 500 ppm by weight solution of the inverted acrylamide polymer in 3% brine solution.

2. Stir for 15 minutes with a cone drive stirrer at 250 RPM using a glass paddle wheel stirrer. Determine the viscosity at 30 RPM using a Brookfield viscometer with a UL adapter. (The latter date is reported in Tables II and III.)

3. Using a millipore pressure filter apparatus, clamp a $5\mu$ mixed cellulose ester pad (47 mm dia.) in place and wash by allowing about 250 of $0.22\mu$ filtered deionized water to flow through by gravity.

4. Pass 70–80 ml. of solution from step 2 through a 200-mesh nylon sieve.

5. Place a 50 ml. graduated cylinder under the drain spout of the millipore apparatus.

6. Add 60 ml. of the freshly prepared solution in step 4 to the apparatus and tightly screw down the cover.

7. Using a pressurized source of gas, start the polymer solution to flow through the filter under 20 psi.

8. Record the cummulative time it takes to collect 5 ml. increments up to 50 ml.

9. The second derivative of the plot of data obtained in step 8 is a measure of the plugging tendency. Values less than 0.002 are considered non-pluggers.

The above described test was applied to both solution hydrolyzed acrylamide polymer prepared as described in the preceeding examples of acrylamide-sodium acrylate copolymer. The results obtained are reported in Tables II and III. Comparison of the flow data shows markedly superior flow (and non-plugging characteristics) for the emulsion hydrolyzed polymer.

EXAMPLE 5

Hydrolyzed acrylamide polymer samples prepared as described in Examples 1 and 2 may be compared to hydrolyzed polyacrylamide prepared by solution hydrolysis. Comparison in the field may be carried out by formulating treating media from the emulsion-hydrolyzed and the solution-hydrolyzed products. If this comparsion were carried out at the input wells in a water flooding operation, it would be found that for polymers hydrolyzed to the extent of 35–40% carboxyl groups, the emulsion-hydrolyzed acrylamide polymer would be at least 10% more effective than the solution-hydrolyzed polymer. "Effectiveness" in this test refers to the quantity of oil produced in a given formation at a given injection pressure and a given solution concentration. Similar results are obtained when inversion is carried out prior to introduction of the treating medium into the well and inversion carried out subsequent to the introduction into the well.

If the above described formulations were applied at the production well, the emulsion hydrolyzed acrylamide polymer would exhibit an oil/water ratio superior to the solution hydrolyzed polymer by at least 10% (based on weight ratios).

TABLE II

PLUGGING TEST RESULTS FOR AN ACRYLAMIDE-SODIUM ACRYLATE COPOLYMER

| SAMPLE NO. | INTRINSIC VISCOSITY (dl/g) | POLYMER CONCENTRATION (PPM) | FLOW* | BROOKFIELD VISCOSITY (CENTIPOISE) | COMMENTS |
|---|---|---|---|---|---|
| 1 | 27.4 | 500 ppm polymer | .0968 | 3.50 | Regular Inversion |
| 2 | 28.3 | " | .0402 | 4.1 | " |
| 3 | 30 | " | .0144 | 4.1 | " |
| 4 | 22.0 | " | .137 | 3.2 | " |
| 5 | 20.7 | " | .172 | 3.1 | " |
| 6 | 32.6 | " | .266 | 3.95 | " |
| 7 | 34.7 | " | .312 | 4.00 | " |
| 8 | 29.8 | " | .0468 | 4.5 | " |
| 9 | 34.9 | " | .1792 | 3.5 | " |
| 10 | 32.4 | " | .034 | 4.7 | " |
| 11 | 27.0 | " | .0426 | 4.05 | " |
| 12 | 21.5 | " | .030 | 3.75 | " |
| 13 | 18.1 | " | .000018 | 2.90 | Regular Inversion; still non-plugging through lower permeability medium |
| 14 | 12.2 | " | −.0000072 | 2.2 | Regular Inversion |
| 15 | 17.8 | " | .290 | 3.1 | " |
| 16 | 19.0 | " | .176 | 3.0 | " |
| 17 | 20.4 | " | .000252 | 3.4 | " |
| 18 | | " | .110 | 3.7 | " |
| 19 | 28.0 | " | .0228 | 4.0 | " |
| 20 | 21.1 | " | .000296 | 3.4 | " |
| 21 | 29.9 | " | .020 | 4.8 | " |

*Rate of change of slope of flow through millipore filter

TABLE III

PLUGGING TEST RESULTS FOR EMULSION HYDROLYZED POLYACRYLAMIDE

| SAMPLE NO. | ESTIMATED EXTENT OF HYDROLYSIS | INTRINSIC VISCOSITY (dl/g) | POLYMER CONCENTRATION (PPM OF ACTIVE POLYMER) | BROOKFIELD VISCOSITY (CENTIPOISE) | FLOW* | COMMENTS |
|---|---|---|---|---|---|---|
| 1 | 46 | 41 | 500 ppm | 5.6 | .0119 | |
| 2 | 36 | 30.7 | " | 4.5 | .00018 | |
| 3 | 36 | 24.6 | " | 3.75 | .00012 | |
| 4 | 36 | 33.5 | " | 4.4 | .00018 | |
| 5 | 36 | 25.0 | " | 4.3 | .00037 | |
| 6 | 36 | 25.1 | " | 3.5 | .000267 | |
| 7 | 36 | 27.5 | " | 3.8 | .000264 | |
| 8 | 26.5 | 33.5 | " | 5.3 | .0872 | |
| 9 | 36 | 43.4 | " | 5.7 | .116 | |
| 10 | 36 | 44.2 | " | 5.85 | .130 | |
| 11 | 46 | 41.0 | 2000 ppm** | 6.0 | .0006 | ½ hour inversion |
| 12 | 26.5 | 33.5 | " | 5.7 | .0184 | " |
| 13 | | 41.4 | 500 ppm | | str. line | One day old |
| 14 | | 37.8 | " | | .0063 | Fresh |
| 15 | | 41.4 | " | | .0134 & .0224 | Fresh |
| 16 | | 19.6 | " | 3.7 | .279 | Regular inversion |
| 17 | | 36.3 | " | 5.3 | .00278 | " |
| 18 | | 36.3 | " | 6.05 | .000306 | Direct inversion |
| 19 | | 36.3 | " | 6.20 | .000952 | " |
| 20 | | 36.3 | " | 5.44 | .00050 | Regular inversion |
| 21 | | 43.3 | " | 5.7 | .00063 | Direct inversion |
| 22 | | 42.3 | 561 ppm | 7.1 | .169 | " |
| 23 | | 2.3 | 543 ppm | 1.4 | .666 | " |
| 24 | | 29.9 | 505 ppm | 4.7 | .00055 | " |

TABLE III-continued

PLUGGING TEST RESULTS FOR EMULSION HYDROLYZED POLYACRYLAMIDE

| SAMPLE NO. | ESTIMATED EXTENT OF HYDROLYSIS | INTRINSIC VISCOSITY (dl/g) | POLYMER CONCENTRATION (PPM OF ACTIVE POLYMER) | BROOKFIELD VISCOSITY (CENTIPOISE) | FLOW* | COMMENTS |
|---|---|---|---|---|---|---|
| 25 | 29.7 | 29.9 | 500 ppm | 4.9 | .00026 | Regular inversion |
| 26 | 23.7 | 25.7 | 2000 ppm** | 4.8 | .000222 | Direct inversion |
| 27 | | 25.7 | 500 act | 3.9 | .000264 | |
| 28 | | 33.3 | " | 4.3 | .000264 | Regular inversion |
| 29 | 46 | 21 | 500 ppm | 3.55 | .000057 | |
| 30 | 36 | 16.7 | " | 3.0 | .266 | |
| 31 | 36 | 18.0 | " | 3.50 | .290 | |
| 32 | 26.5 | 17.5 | " | 3.1 | .123 | |
| 33 | 36 | 21 | 2000 ppm** | 3.2 | .000091 | Direct inversion |
| 34 | 36 | 30.6 | 500 ppm | 4.7 | .000228 | Regular inversion |
| 35 | 37 | 31 | 500 ppm | 3.3 | .000434 | Direct inversion |
| 36 | 25 | 30.9 | " | 3.8 | .250 | |
| 37 | | 16.7 | " | 3.0 | .266 | |
| 38 | | 18.0 | " | 3.5 | .290 | |
| 39 | 40 | 33.5 | " | 4.4 | .000181 | |
| 40 | 37 | 24.6 | " | 3.8 | .00012 | |
| 41 | 35 | 30.7 | " | 4.5 | .00018 | |
| 42 | 39 | 41.4 | " | 5.65 | .02240 | |
| 43 | 42 | 37.8 | " | 5.4 | .00063 | |
| 44 | 37 | 30.6 | " | 4.7 | .000238 | |
| 45 | 39 | 44.3 | " | 5.7 | .116 | |
| 46 | 40.5 | 43.5 | " | 5.85 | .130 | |
| 47 | 40 | 36.3 | " | 5.3 | .000238 | |
| 48 | | 19.6 | " | 3.7 | .279 | |

*Rate of change of slope of a plot of flow through millipore filter.
*Overall polymer product.

We claim:

1. A process for recovering oil from subterranean oil-bearing formations which comprises introducing via a well bore into said formations in the presence of water under inversion conditions, a treating medium comprising an acrylamide-acrylic acid copolymer, said acrylamide-acrylic acid copolymer having been formed by hydrolyzing a water-in-oil emulsion contained dispersed therein from 10–45% by weight of finely divided acrylamide polymer to such an extent that between 0.8 and about 67% of the amide groups originally present in the acrylamide polymer have been converted into carboxyl groups wherein the hydrolyzed water-in-oil emulsion of the treating medium is inverted after the treating medium is introduced into the oil-bearing formation.

2. A process for recovering oil from subterranean oil-bearing formations which comprises introducing via a well bore into said formation in the presence of water under inversion conditions, a treating medium comprising an acrylamide-acrylic acid copolymer, said acrylamide-acrylic acid copolymer having been formed by hydrolyzing a water-in-oil emulsion containing dispersed therein from 10–45% by weight of finely-divided acrylamide polymer to such an extent that between 0.8 and about 67% of the amide groups originally present in the acrylamide polymer have been converted into carboxyl groups wherein the water-in-oil emulsion of the treating medium is inverted after hydrolysis but prior to the introduction of the treating medium into the subterranean oil-bearing formation.

3. A process for recovering oil from subterranean oil-bearing formations which comprises introducing a flooding medium in the presence of water under inversion conditions into an input well penetrating said formation and forcing said flooding medium through said formation toward at least one producing well penetrating said formation at a distance from said input well, said flooding medium comprising a water-in-oil emulsion containing dispersed therein from 10–45% by weight of a finely-divided acrylamide polymer, said water-in-oil emulsion having been hydrolyzed to such an extent that between 0.8 to about 67% of the amide groups originally present in the acrylamide polymer have been converted into carboxyl groups wherein the hydrolyzed water-in-oil emulsion of the flooding medium is inverted after the flooding medium is introduced into the oil-bearing formation.

4. The process of claim 3 wherein the water-in-oil emulsion is hydrolyzed to such an extent that between 12 and about 40% of the amide groups originally present in the acrylamide polymer have been converted into carboxyl groups.

5. The process of claim 3 wherein the water-in-oil emulsion prior to hydrolysis is comprised of:
   A. acrylamide polymer having a concentration between about 10 and 45% by weight;
   B. a water-in-oil emulsifying agent having a concentration between about 3 and 15% by weight; and,
   C. the remainder organic liquid and water in the ratio of organic liquid to water of 5:1 to 1:10 by weight.

6. The process of claim 3 wherein the water-in-oil emulsion prior to hydrolysis is comprised of:
   A. water ranging between about 0.25 and 4% by weight;
   B. acrylamide polymer having a concentration between about 0.1 and 10% by weight;
   C. a water-in-oil emulsifying agent having a concentration between about 0.0005 and 5% by weight; and
   D. the remainder an organic liquid.

7. The process of claim 3 wherein the flooding medium is introduced into the input well in the presence of a water-soluble surfactant.

8. A process for recovering oil from subterranean oil-bearing formations which comprises introducing a flooding medium in the presence of water under inversion conditions into an input well penetrating said formation and forcing said flooding medium through said formation toward at least one producing well penetrating said formation at a distance from said input well, said flooding medium comprising a water-in-oil emulsion containing dispersed therein from 10–45% by weight of a finely-divided acrylamide polymer, said water-in-oil emulsion having been hydrolyzed to such an extent that between 0.8 to about 67% of the amide groups originally present in the acrylamide polymer have been converted into carboxyl groups wherein the hydrolyzed water-in-oil emulsion of the flooding medium is inverted after hydrolysis but prior to the introduction of the flooding medium into the input well.

9. The process of claim 8 wherein the water-in-oil emulsion is hydrolyzed to such an extent that between 12 and about 40% of the amide groups originally present in the acrylamide polymer have been converted into carboxyl groups.

10. The process of claim 8 wherein the water-in-oil emulsion, prior to hydrolysis is comprised of:
A. acrylamide polymer having a concentration between about 10 and 45% by weight;
B. a water-in-oil emulsifying agent having a concentration between about 3 and 15% by weight; and,
C. the remainder organic liquid and water in the ratio of organic liquid to water of 5:1 to 1:10 by weight.

11. The process of claim 8 wherein the water-in-oil emulsion, prior to hydrolysis is comprised of:
A. water ranging between about 0.25 and 4% by weight;
B. acrylamide polymer having a concentration between about 0.1 and 10% by weight;
C. a water-in-oil emulsifying agent having a concentration between about 0.0005 and 5% by weight; and,
D. the remainder an organic liquid.

12. The process of claim 8 wherein the inversion is accomplished by adding said hydrolyzed water-in-oil emulsion of acrylamide polymer to water which contains 1.0–10% by weight based on the weight of the acrylamide polymer of a water-soluble surfactant whereby the hydrolyzed acrylamide polymer is released into the water as a solution.

* * * * *